Feb. 21, 1967   J. F. BLUMRICH ET AL   3,304,724
TANK CONSTRUCTION FOR SPACE VEHICLES
Filed Jan. 28, 1965                    2 Sheets-Sheet 1

INVENTORS
JOSEF F. BLUMRICH
CARL A. LOY
BY
*H McCoy*
*James O. Harrell*
ATTORNEYS Feb. 21, 1967    J. F. BLUMRICH ET AL    3,304,724
TANK CONSTRUCTION FOR SPACE VEHICLES
Filed Jan. 28, 1965    2 Sheets-Sheet 2

INVENTORS
JOSEF. F. BLUMRICH
CARL A. LOY
BY
ATTORNEYS

United States Patent Office 3,304,724
Patented Feb. 21, 1967

3,304,724
TANK CONSTRUCTION FOR SPACE VEHICLES
Josef F. Blumrich and Carl A. Loy, Huntsville, Ala., assignors to the United States of America as represented by the Administrator of the National Aeronautics and Space Administration
Filed Jan. 28, 1965, Ser. No. 428,882
13 Claims. (Cl. 60—257)

The invention described herein may be manufactured and used by or for the Government of the United States of America for governmental purposes without the payment of any royalties thereon or therefor.

The present invention relates generally to space vehicles and more particularly to the construction of liquid propellant tanks used in conjunction with rockets, missiles, etc.

In the early development of space vehicles, the liquid propellant tanks consisted of relatively long cylindrical body portions having small radii and conventional type of curved bulkheads. These tanks were designed to serve as both the storage containers for the liquid propellants and the load bearing structures for supporting the rocket engine thrust structures. At this early stage in the development of space vehicles, it had been found that the most efficient tank construction from the standpoint of minimum weight of fairing skirts, minimum weight and size of the bulkheads for the stress requirements, structure convenience for mounting the rocket engines underneath the tanks, allowable residual propellant left in the tanks because of vortexing, and accessibility of the tank exists for high engine feedrate without vortexing was attained by using what is now known as the standard ellipsoidal bulkhead. The depth of this type of bulkhead added relatively little to the overall length of the long, slender space vehicle. Therefore, the bulkhead depth and the weight of the fairing skirts were rather unimportant at this time in the design of the tank bodies.

As the development of space vehicles progressed into the use of large rocket engines having more thrust and longer burning time, it became necessary to utilize liquid propellant tanks having extremely large volumes. The increase in both the number and size of the rocket engines, as well as in the volumes of the tanks, demanded an increase in tank diameters. With increasing tank diameters, the depth of the standard ellipsoidal bulkhead accordingly became larger and thus constituted a substantial and undesirable percentage of the overall length of the space vehicle. These deep bulkheads also caused a considerable increase in the size and weight of the fairing skirts. The further development of large multistage space vehicles compounded the problems encountered in utilizing the standard ellipsoidal bulkheads since the tanks had to be arranged in an end-to-end relationship. The undesirable effects of the ellipsoidal bulkhead shape on the weight, length and bending frequency of the space vehicle having a large diameter tank prompted the need for an improved configuration and construction of space vehicle propellant tanks.

Attempts have been made to construct larger diameter tanks from right circular cylinders and ellipsoidal bulkheads of different depths. However, analysis usually showed that an optimum design for a tank, which was to serve as the load bearing structure, could be obtained only where the ratio of the tank radius to the bulkhead depth was in the neighborhood of the square root of two. This meant that the depth of the ellipsoidal bulkhead should equal the radius of the tank divided by the square root of two. Thus, it can be readily seen that the overall length of the tank would be increased substantially since the depth of the ellipsoidal bulkhead had to be increased in proportion to any increase in the diameter of the tank.

Other tank designs have been considered due to the length problem encountered with multistage space vehicles. One of the more promising designs consists of a cylindrical body which is divided into two compartments by an internal or common bulkhead. Such a design does not reduce the depth of the bulkheads but does eliminate two of the ellipsoidal bulkheads in each vehicle stage by substituting one tank of two compartments for the two separate tanks previously used. However, the internal bulkhead is common to both compartments and, therefore, must be absolutely leakproof since it frequently separates propellants whose temperatures differ by hundreds of degrees and which may also be hypergolic. The manufacture of the common bulkhead tank to the reliability required for rocket vehicle use is also difficult and very expensive.

In accordance with the present invention, it has been found that the foregoing difficulties and disadvantages presented by the prior tank designs discussed above may be overcome by providing a novel tank having bulkheads of a unique configuration and a central supporting post. This tank design consists of the following basic parts: (1) a cylindrical body, (2) a bulkhead having a semitoroidal configuration attached to each end of the cylindrical body, and (3) a supporting column extending through the center of the cylindrical body and having one end thereof connected to the rocket engine thrust structure. The semitoroidal bulkheads constitute a relacement for the standard ellipsoidal bulkheads used heretofore on liquid propellant tanks. The semitoroidal bulkhead of the present invention has all of the advantages of the standard ellipsoidal bulkhead and, in addition, is very shallow in depth. The supporting column and rocket engine thrust structure provide the load bearing structures rather than the liquid propellant tanks which have heretofore served such purpose. The supporting column may also be used to support more than one tank on the rocket engine thrust structure.

Accordingly, it is an object of this invention to provide a space vehicle having a tank design which increases the volume to length ratio in large diameter tanks.

It is also an object of this invention to provide a space vehicle having a tank bulkhead of a semitoroidal configuration which is shallower than the standard ellipsoidal bulkhead.

Another object of the present invention is to provide a space vehicle in which the liquid propellant tanks are supported on a separate load bearing structure.

A further object of this invention is to provide a space vehicle which results in a considerable saving in construction and maintenance cost.

Other objects and advantages of this invention will become more apparent from a reading of the following detailed description and appended claims taken in conjunction with the accompanying drawings wherein:

Figure 1:
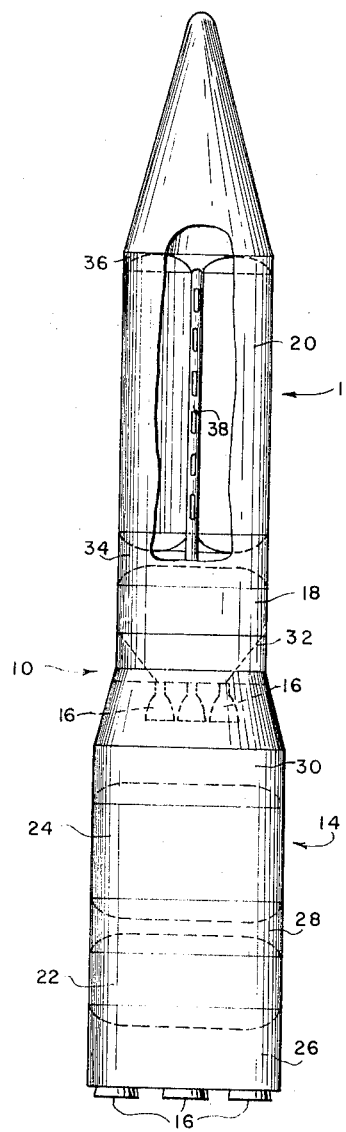
FIGURE 1 is a schematic view of a space vehicle with a portion of the upper stage cut away to disclose the liquid propellant tanks mounted thereon.

Referring now in more detail to the drawing wherein like reference numerals designate identical or corresponding parts throughout the several views, and with special attention to FIGURE 1, reference numeral 10 generally designates a space vehicle, shown as a multistage rocket, which the present invention forms a part thereof. The multistage rocket 10 consists of an upper stage 12 and lower stage 14 having a plurality of reaction motors 16 connected thereto. The upper stage 12 is made up of liquid propellant tanks 18 and 20 arranged in an end-to-end relationship; whereas, the lower stage 14 has similar tanks 22 and 24. The outer skin of the multistage rocket 10 is completed by having a plurality of fairing skirts 26, 28, 30, 32, 34 and 36 attached to the respective tanks 18, 20, 22 and 24.

Figure 2:
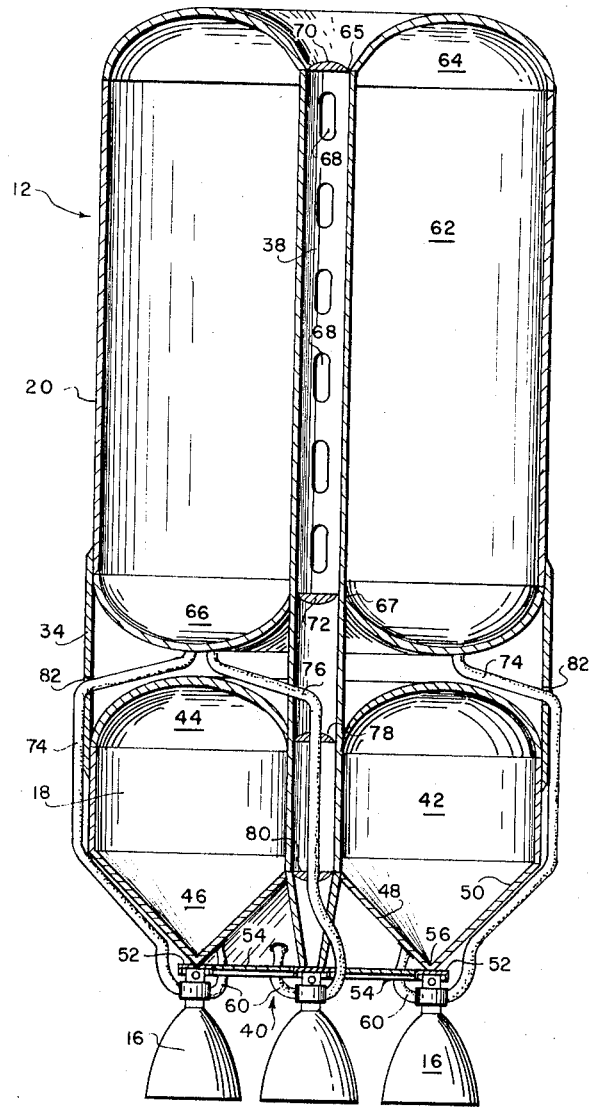
FIGURE 2 is a cross sectional view taken through approximately the center of the main portion of the upper stage of the space vehicle.

As shown more clearly in FIGURE 2, the liquid propellant tanks 18 and 20 are mounted on a hollow supporting column 38 extending through the center of each tank. The lower end of the column 38 is mounted on a thrust structure designated generally by reference numeral 40 which will be described more in detail hereinafter. The liquid propellant tanks 22 and 24 of the lower stage 14 may be mounted in the same manner as tanks 18 and 20. These tanks may also be used to store any kind of liquid utilized for propelling a space vehicle, such as, for example, liquid hydrogen, oxygen, etc.

The liquid propellant tank 18, shown more clearly in FIGURE 2, consists of a cylindrical body portion 42 with upper and lower bulkheads 44 and 46 welded to the respective ends thereof. The bulkheads 44 and 46 are welded to the lower portion of the supporting column 38 which is extended through the center of the cylindrical body portion 42. The lower bulkhead 46 has substantially an annular or semitoroidal configuration which when viewed in cross section, as shown in FIGURE 2, forms two adjacent triangles. The lower bulkhead 46 may also be visualized as consisting of inner and outer conical portions, designated by reference numerals 48 and 50, respectively.

Figure 3:
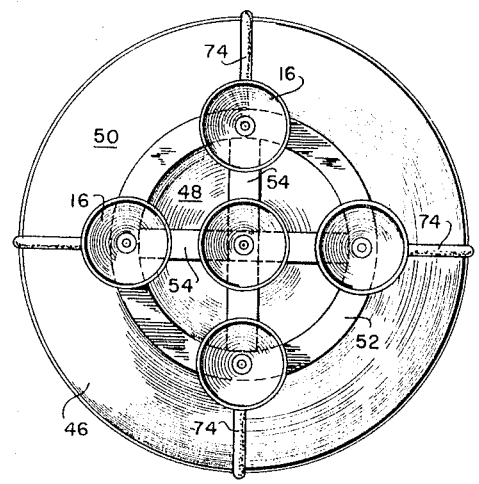
FIGURE 3 is a bottom plan view of the upper stage of the space vehicle.

In FIGURES 2 and 3, the thrust structure 40 is shown comprising a channel-shaped ring 52 reinforced by a plurality of struts 54 extending toward the center thereof. The bulkhead 46 also forms a part of the thrust structure 40 and further constitutes the load carrying support for the column 38. The bulkhead 46 is constructed in such a manner that the inner and outer conical portions 48 and 50 form a bottom edge 56 which is welded or otherwise secured to the ring 52. It is to be understood that the thrust structure 40 may be formed from structural arrangements other than that specifically shown in FIGURES 2 and 3. For example, an independent thrust beam structure may be utilized for supporting the column 38 and several rocket engines 16 depending on the engine arrangement. With this structural arrangement, the lower bulkhead could be of the same semitoroidal configuration as the upper bulkhead 44 and would accordingly be separated from the thrust structure.

As shown in FIGURE 2, the rocket engines 16 are connected to the thrust structure 40 by using well known gimballing techniques. The bottom portion of the lower bulkhead 46 is also provided with a plurality of fuel lines 60 for feeding the liquid propellant to the rocket engines 16. The upper bulkhead 44 of the liquid propellant tank 18 is welded to the supporting column 38 at the point where it extends through the center of the semitoroidal configuration.

The liquid propellant tank 20 is located above the liquid propellant tank 18 and consists of a cylindrical body portion 62 with upper and lower bulkheads 64 and 66 welded to the respective ends thereof. The bulkheads 64 and 66 are secured to the supporting column 38 which is extended through the center of the cylindrical body portion 62. These bulkheads 64 and 66 are similar to the upper bulkhead 44 of the liquid propellant tank 18 in that each has an annular or semitoroidal configuration which forms two adjacent semiellipses when view in cross section, as shown in FIGURE 2. Geometrically, each of the annular or semitoroidal bulkheads 64 and 66 can be visualized as consisting of a configuration which is formed by dividing an ellipse into a semiellipse (the portion on one side of an ellipse's major axis) and revolving the semiellipse 360 degrees about a perpendicular axis parallel to a line tangent to the semiellipse at one end of the major axis of the original ellipse. In FIGURE 2, the line which is tangent to the semiellipse is located at a point adjacent the outer surface of the supporting column 38. This results in circular openings 65 and 67 being formed in the bulkheads 64 and 66 at the points where they are secured to the supporting column 38. The unique semitoroidal bulkhead discussed above has been proven to result, from a structural standpoint, in a superior tank construction over those which employ the conventional bulkhead having an ellipsoidal configuration. The more specific advantage of the semitoroidal bulkhead reducing the overall length of a space vehicle will be discussed hereinafter in conjunction with the tanks shown in FIGURES 6 and 7. It is to be understood that the cross-section of the bulkhead is not to be limited to a semiellipse. For example, the cross section of the bulkhead could be oval, semicircular or any other feasible configuration.

As mentioned hereinbefore, the liquid propellant tanks 18 and 20 are supported on the fairing skirt 32 and on the column and on the hollow column 38 which form, along with the thrust structure 40, the load bearing structure for the entire stage 12. The column 38 is hollow and is also provided with a plurality of openings 68 for permitting the liquid propellant to enter therein so as to afford additional storage space. In order to store the liquid propellant within the hollow post 38, upper and lower plugs 70 and 72 are provided therein for sealing off that portion of the post 38 which extends through the center of the cylindrical body portion 62. It is to be understood, however, that the column 38 may be constructed other than as specifically shown. For example, the openings 68 and plugs 70 and 72 could be eliminated and the area within the hollow post used to store electrical wiring, equipment or other paraphernalia. The area within that portion of the column 38 which extends through the center of the cylindrical body portion 42 of tank 18 may also be used for similar purposes.

Located adjacent the bottom of the lower bulkhead 66 is a plurality of fuel lines 74 for feeding the liquid propellant stored in the tank 20 to the rocket engines 16. In FIGURE 2, an additional fuel line 76 is extended through the hollow column 38 for feeding the liquid propellant to the rocket engine 16 locted in the center of the upper stage 12. The fuel line 76 is also extended through the plugs 78 and 80 which are similar to the plugs 70 and 72. These plugs 78 and 80 further serve as a means for supporting the fuel line 76. The fuel lines 74 are shaped so as to extend around the tank 18 and through a plurality of openings 82 located in the fairing skirt 34 which extends between the tanks 18 and 20. The fairing skirt 34 is permanently attached to the tanks 18 and 20 by having the upper and lower ends thereof welded or bolted to the respective cylindrical body portions 42 and 62. The fuel lines may obviously be arranged in any other convenient manner, such as, for example, by having all of them extended through the hollow column 38 or through the tank 18 itself.

Figure 4:
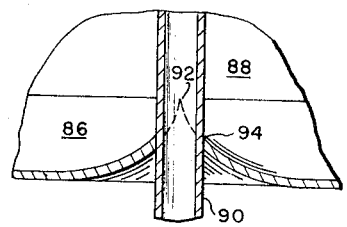
FIGURE 4 is a partial cross sectional view showing a modified bulkhead arrangement.

In FIGURE 4, an alternate embodiment of a part of the invention is illustrated. In this particular embodiment, a bulkhead 86 is welded to the lower end of a cylindrical tank body 88 and to a hollow supporting column 90 which extends through the center of the tank body 88. The bulkhead 86 has a semitoroidal configuration which is similar to the configuration discussed above in connection with the embodiment shown in FIGURE 2 except that the perpendicular axis about which the semiellipse is resolved is collinear with the line tangent to the semiellipse at the end of the major axis of the original ellipse. The point where such perpendicular axis and line are collinear is designated by reference numeral 92. With the hollow column 90 extended through the bulkhead 86, a circular opening 94 is formed in the center portion of the bulkhead 86 at a locality below the point 92, as shown in FIGURE 4. Consequently, the bulkhead 86 may be welded easily to the hollow column 90 at the point where it extends through the opening 94.

Figure 5:
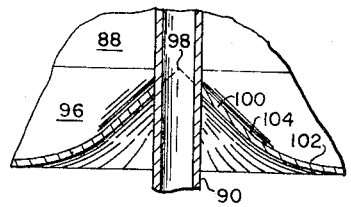
FIGURE 5 is a partial cross sectional view showing still another modified bulkhead arrangement.

The alternate embodiment of the invention shown in FIGURE 5 is similar to that shown in FIGURE 4 except for the particular shape of the bulkhead which is secured to the tank body 88 and hollow column 90. Here, a bulkhead 96 is utilized and is formed by revolving a semiellipse 360 degrees about a perpendicular axis extending through point 98 which may be identified in the same manner as the point 92 shown in FIGURE 4. As shown in cross section in FIGURE 5, a portion 100 of the semiellipse is straight rather than curved like the remaining portion 102 of the ellipse. The portion 100 of the ellipse is secured to or formed integral with the remaining portion 102 at a point designated by reference numeral 104. This construction results in the hollow column 90 extending through a circular opening 106 located slightly below the point 98. The alternate embodiments of the invention shown in FIGURES 4 and 5 simplify to some extent the connection of the semitoroidal to the supporting column by increasing the angle between the bulkhead and the column and thereby improving the efficiency of the welding operation.

Figure 6:
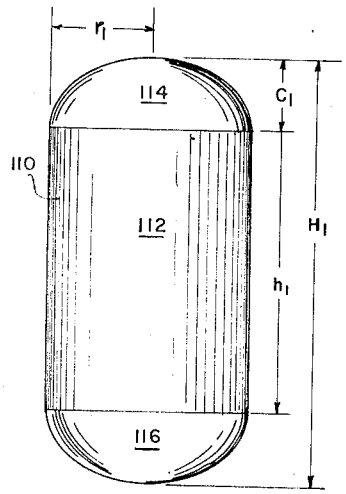
FIGURE 6 is a schematic, elevational view of a tank having standard ellipsoidal bulkheads.
Figure 7:
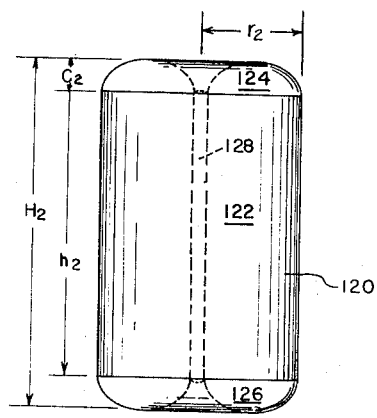
FIGURE 7 is a schematic, elevational view of a tank having semitoroidal bulkheads of the present invention.

With reference to FIGURES 6 and 7, one can readily see that the use of semitoroidal bulkheads in the tank construction of the present invention would definitely have the effect of reducing the overall length of space vehicles which hereinbefore have been constructed from tanks having standard ellipsoidal bulkheads. In FIGURE 6, a tank 110 is shown consisting of a cylindrical body portion 112 having standard ellipsoidal bulkheads 114 and 116 secured to the opposite ends thereof. In FIGURE 7, a tank 120 is shown consisting of a cylindrical body portion 122 having semitoroidal bulkheads 124 and 126 secured to the opposite ends thereof. For additional support, a support column 128 extends through the center of the cylindrical body portion 122 and interconnects the semitoroidal bulkheads 124 and 126.

As illustrated in FIGURES 6 and 7, tank 110 has an overall length $H_1$; whereas tank 120 has an overall length $H_2$. The lengths of the cylindrical body portions 112 and 122 are designated by references $h_1$ and $h_2$, respectively. To further explain the difference in the overall lengths $H_1$ and $H_2$, the particular geometry involved will now be considered. In constructing space vehicles, one is usually limited to a specific tank volume and radius. Therefore, it will be assumed that the volume $V_1$ and radius $r_1$ of the tank 110 are equal to the volume $V_2$ and radius $r_2$ of tank 120. From a structural standpoint, it has been found that the ratio of the tank's radius to the bulkhead depth should be equal to the square root of two. For simplicity, this ratio will be referred to as factor "$m$." In analyzing tank 110 with the semiellipsoidal bulkheads 114 and 116, the volume is found to be $V_1 = \pi r_1^2 (h_1 + 4/3\, C_1)$, where $C_1 = mr_1$. With respect to tank 120 having the semitoroidal bulkheads 124 and 126, the volume is $V_2 = \pi r^2 (h_2 + \pi/2\, C_2)$, where $C_2 = mr_2/2$. In these instances, $C_1$ equals the depth of the ellipsoidal bulkhead and $C_2$ equals the depth of the semitoroidal bulkhead. The above equations prove that $H_2 = H_1$. The equation for the overall length of tank 120, as derived under the condition where $V_1 = V_2$, is $H_2 = H_1 - 0.452 mr_1$. Hence, the difference in the lengths $H_1$ and $H_2$ is equal to $0.452/\sqrt{2 \times r_1}$. For example, if tank 110 is to have a 200 inch radius, tank 120 with the same radius would be $0.452/\sqrt{2 \times 200}$ or approximately 5 feet shorter. Such a considerable reduction in the length of tanks to be used to construct large space vehicles shows the desirability of using the semitoroidal bulkheads of the present invention, which has clearly proven that the use of the standard ellipsoidal bulkheads in such an application is obsolete. The tank construction of the present invention has other structural advantages which are obvious to those skilled in the space vehicle construction field.

Obviously numerous modifications and variations of the present invention are possible in the light of the above teachings. It is, therefore, to be understood that within the scope of the appended claims the invention may be practiced otherwise than as specifically described.

What is claimed and desired to be secured by United States Letters Patent is:

1. A space vehicle comprising, in combination:
   (A) a thrust structure;
   (B) a rocket engine connected to said thrust structure;
   (C) a propellant tank having a cylindrical body and bulkheads secured to the opposite ends thereof;
   (D) a supporting column attached to said bulkheads and extended through the center of said cylindrical body;
   (E) one of said bulkheads having a semitoroidal configuration; and
   (F) one end of said supporting column connected to said thrust structure.

2. A space vehicle as defined in claim 1 wherein said semitoroidal configuration constitutes a geometrical figure formed by revolving a semiellipse 360 degrees about an axis parallel to a line tangent to said semiellipse at one end of the major axis of the original ellipse.

3. A space vehicle as defined in claim 1 wherein said semitoroidal configuration constitutes a geometrical figure formed by revolving a semiellipse 360 degrees about an axis collinear with a line tangent to said semiellipse at one end of the major axis of the original ellipse.

4. A space vehicle as defined in claim 3 wherein a portion of said semiellipse is a straight line.

5. A space vehicle comprising, in combination:
   (A) a thrust structure;
   (B) a rocket engine connected to said thrust structure;
   (C) a propellant tank having a cylindrical body and upper and lower bulkheads secured to the respective ends thereof; and
   (D) a supporting column attached to said upper and lower bulkheads and extended through the center of said cylindrical body;
   (E) said thrust structure being formed in part by said lower bulkhead which serves as a load bearing support for said propellant tank and said supporting column.

6. A space vehicle as defined in said claim 5 wherein said upper bulkhead has a semitoroidal configuration.

7. A space vehicle as defined in claim 5 wherein said lower bulkhead comprises inner and outer conical portions connected together to form substantially an annular configuration.

8. A space vehicle comprising, in combination:
   (A) a thrust ring;
   (B) a rocket engine mounted on said thrust ring;
   (C) a propellant tank having a cylindrical body and bulkheads secured to the opposite ends thereof;
   (D) a supporting column attached to said bulkheads and extended through said cylindrical body; and
   (E) one of said bulkheads connected to said thrust ring and adapted to serve as a load bearing support for said propellant tank and said supporting column.

9. A space vehicle as defined in claim 8 which further comprises:
   (A) a plurality of struts extending toward the center of said thrust ring; and
   (B) one end of said supporting column being connected to said plurality of struts at a point adjacent the center of said thrust ring.

10. A space vehicle comprising, in combination:
(A) a thrust ring;
(B) a rocket engine mounted on said thrust ring;
(C) a first propellant tank;
(D) a second propellant tank;
(E) a supporting column attached to said first and second propellant tanks and extended through the center of each; and
(F) one end of said supporting column connected to said thrust ring;
(G) said thrust ring being connected to said first propellant tank.

11. A space vehicle comprising, in combination:
(A) a thrust ring;
(B) a rocket engine mounted on said thrust ring;
(C) a first propellant tank having a cylindrical body and bulkheads secured to the opposite ends thereof;
(D) a second propellant tank having a cylindrical body and bulkheads secured to the opposite ends thereof;
(E) a supporting column attached to said bulkheads and extended through said cylindrical bodies; and
(F) one of said bulkheads connected to said thrust ring and adapted to serve as a load bearing support for said first and second propellant tanks and said supporting column.

12. A space vehicle as defined in claim 11 which further comprises:
(A) a plurality of fuel lines interconnecting said first and second propellant tanks and said rocket engines; and
(B) one of said plurality of fuel lines extending through said supporting column.

13. A space vehicle as defined in claim 11 wherein said supporting column is hollow and adapted to provide additional storage space for liquid propellants.

References Cited by the Examiner
UNITED STATES PATENTS 3,230,708  1/1966  Huang _____ 60—39.48 X

References Cited by the Applicant
UNITED STATES PATENTS 2,627,231  2/1953  Kraemer.
3,038,408  6/1962  Kluge.

MARK NEWMAN, *Primary Examiner.*

D. HART, *Assistant Examiner.*